Nov. 24, 1936.   O. A. SORENSEN   2,061,987
SPRAY DEVICE
Filed July 14, 1934
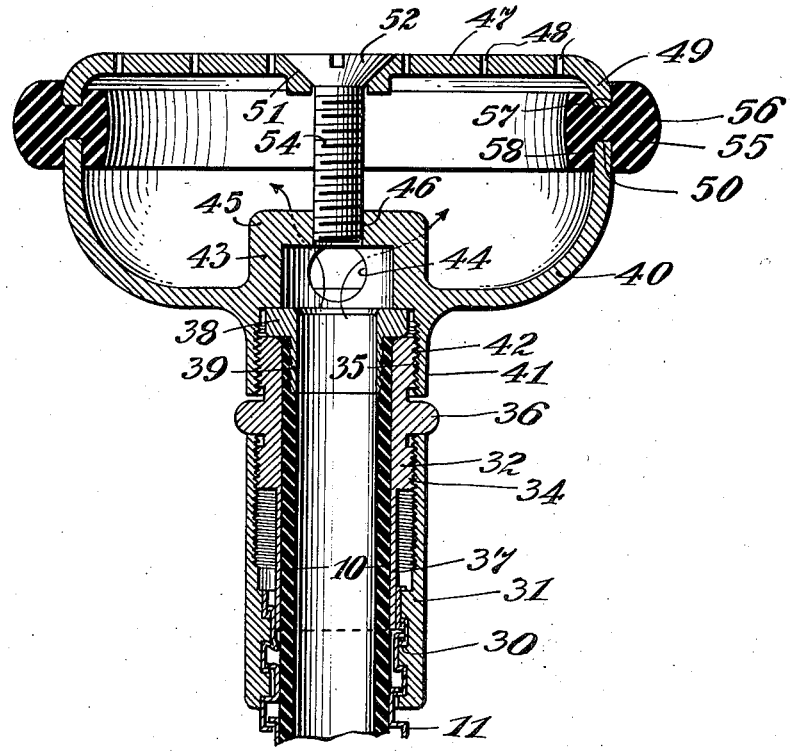
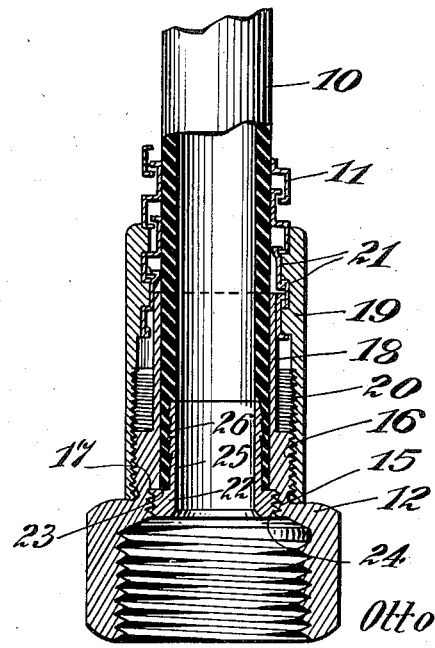
INVENTOR
Otto A. Sorensen
BY
Ramsey & Kent
his ATTORNEYS Patented Nov. 24, 1936

2,061,987

UNITED STATES PATENT OFFICE 2,061,987

SPRAY DEVICE

Otto A. Sorensen, Lakeview, N. Y.

Application July 14, 1934, Serial No. 735,141

2 Claims. (Cl. 299—141)

This invention relates to spray devices and more particularly to spray devices made up of a composite flexible hose having terminal members secured to the ends thereof, one of which terminal members is in the nature of a spray head.

An object of the invention is to provide a new, simple and efficient spray device in which the composite flexible hose is permanently secured to the terminal members.

Another object of the invention is to provide in a spray device having a flexible metal outer tube, means for locking such tube to the terminal members to prevent removal thereof.

A further object of the invention is to provide a guard member for the spray head of such construction that the guard member can not be removed from the head withhout dismantling the head.

A still further object of the invention is to provide a spray head made up of a number of parts, including a guard member, all of which parts are locked together by a single locking member.

In accordance with the invention the spray device thereof consists of a composite hose made up of an outer flexible metallic tube and an inner hose of rubber or some similar substance. To the ends of such composite hose are fastened terminal members in such fashion that the hose can not be readily disconnected from the terminal parts. Preferably a part of each terminal member is so constructed as to provide internal threads for engagement with the spiral ribs of the flexible metallic tube, and a sleeve is provided for locking such ribs to the threads of the terminal member following deformation of the threads by a suitable mandrel in the assembly of the device. At the same time gripping members are provided for gripping the inner hose and locking it to the member carrying the sleeve which locks the outer hose in place. To one of the terminals of the composite hose is attached a spray head made up of two parts which are held apart by means of a guard made of rubber or some suitable material so shaped as to have a rounded portion extending beyond the normal outline of the head. The parts of the head and the guard are held together by a single screw passing through a perforated plate and into a threaded aperture formed in a bridge made integral with the other part of the head.

Other features, objects and advantages of the invention will become apparent by reference to the following detail description taken in connection with the accompanying drawing which illustrates in section a device embodying the invention.

Referring now to the drawing, 10 indicates a hose of rubber or other suitable material positioned within a flexible metallic tube 11 constructed in the usual fashion. One end of the composite hose made up of the members 10 and 11 is secured to a terminal member 12, the extremity of which is internally threaded as at 14 for attachment to the external threads of a liquid conduit, such as a water pipe. A part of the member 12 is internally threaded as at 15 while another portion is externally threaded as at 16. Threads 15 terminate at a shoulder 17 while the portion provided with the thread 16 has a tubular thin extension or sleeve 18 for a purpose to be explained hereinafter. In conjunction with the terminal member 12 use is made of a tubular sleeve 19 internally threaded as at 20 for engagement with threads 16. This sleeve 19 is also provided with internal square threads 21 for engagement with the spiral ribs in the metallic flexible hose 11. A hose gripping member 22 has an annular shoulder 23 for engagement with the shoulder 17 and is provided with external threads 24 for engagement with the threads 15. This gripping member 22 has a neck portion 25 provided with spaced annular teeth 26 of such construction as to bite into the rubber hose 10.

The other end of the composite hose is secured to a spray head in the following manner. The spiral ribs of the flexible metallic tube are threaded into engagement with threads 30 of a sleeve 31 similar to the sleeve 19. An intermediate member 32 is provided with external threads 34 and external threads 35 separated by an enlarged bead 36. This intermediate member 32 has a thin tubular sleeve extension 37 similar to the sleeve extension 18. A hose gripping member 38 has teeth 39 similar to teeth 26 but the annular flange part of this gripping member is unthreaded.

The spray head is made up of a dome-like member 40 having a neck 41 internally threaded as at 42 for engagement with the threads 35 of the intermediate member. Integral with the dome 40 is a bridge 43 provided with oppositely disposed openings 44 for passage of liquid and having the top portion 45 thereof provided with a centrally disposed threaded aperture 46. The other member making up the spray head comprises a plate 47 provided with a plurality of through openings 48 and having its edges turned into a flange 49 of substantially the same diameter as the upper edge 50 of the dome 40. The plate 47 is provided with a central aperture reamed out as at 51 for the reception of the head 52 of a screw 54, the threads of which engage the threads of the opening 46 in the bridge.

Separating the two parts of the spray head and held therebetween is a guard 54 of rubber or some other suitable material having a rounded exterior 56 and being provided with recesses 57 and 58 for the reception respectively of the flange 49 and the edge 50. This guard is held in proper position relative to the parts 40 and 47 and these two parts are in turn held in assembly by means of the single screw 45 positioned as before explained.

In order that the flexible metallic tube can not become unscrewed from the external sleeves 19 and 31, the invention contemplates locking the flexible tube to these sleeves and to the other parts making up the terminal assemblies. For this reason the order of assembly of the parts is substantially as follows. One end of the flexible metallic tube is threaded into the outer sleeve 19 and then the turns of the tube within the sleeve are flattened against the square threads as shown in the drawing by a suitable mandrel. The rubber hose 10 may then be passed through the flexible tube and the external sleeves, this hose being of such length as to extend a considerable distance beyond each end of the flexible tube. The attaching member 12 may then be secured to the external sleeve 19 by engagement of threads 16 and 20. As these two parts are brought together the thin sleeve 18 enters the space between the rubber hose 10 and the flattened out portions of the metallic tube. The sleeve is of such external diameter as to press the flexible metallic tube firmly against the internal wall of the sleeve 19 so that the flexible tube can not become unscrewed from this sleeve 19. The gripping member 22 may then be inserted in the end of the hose 10 and then screw threaded into the attaching member 12 as shown. Thus, on account of the biting action of the teeth 26 the rubber hose can not be pulled through the flexible metallic tube.

The same order of assembly is carried out at the other end of the composite hose, namely, the flexible metallic tubing is threaded into engagement with the sleeve 31, flattened by a mandrel, and then the intermediate member 32 is secured to this member 31 with the thin sleeve 37 serving to lock the flexible tube to the sleeve 31. The gripping member 38 is pressed into biting engagement with the end of the rubber hose coming to rest against the end of the intermediate member 32. The spray head may then be secured to the intermediate member by engagement of threads 35 and 42.

The invention as hereinbefore described possesses numerous advantages over prior structures. The construction wherein the outer flexible metallic tube is firmly locked to the terminal assemblies efficiently serves to prevent accidental displacement of this tube. At the same time the rubber hose is firmly locked against creeping so that the unity of the composite hose is maintained. The spray head possesses the advantage that it can be rapidly assembled or dismantled so that if necessary a new guard can be provided at any time. The construction is such that the guard is held firmly to the head, being incapable of being removed without separating the two parts making up the head, namely, the dome and the orificed plate.

I claim:

1. A spray head comprising a dome-like member having a hollow neck portion, an orificed plate having an inturned flange, a guard member of resilient material provided with oppositely disposed inwardly directed recesses of substantially rectangular shape in cross section sized to snugly receive the edge of said flange and the edge of said dome, and means for locking said plate to said dome with said guard interposed between adjacent edges.

2. A spray head comprising a dome-like member having a hollow neck portion, an internal bridge member having openings in communication with said neck and being provided with a threaded orifice, an orificed plate provided with a central aperture and with an inturned flange, a locking member passing through said aperture into said threaded orifice for holding the parts in assembly, and a guard of resilient material interposed between the dome-like member and the plate and held against removal by said locking member, said guard having oppositely disposed inwardly directed recesses of substantially rectangular shape in cross section sized to snugly receive edges of the dome-like member and the flange.

OTTO A. SORENSEN.